(No Model.)
S. P. MACKEY.
WEIGHING OR MEASURING MACHINE.
No. 569,878. Patented Oct. 20, 1896.
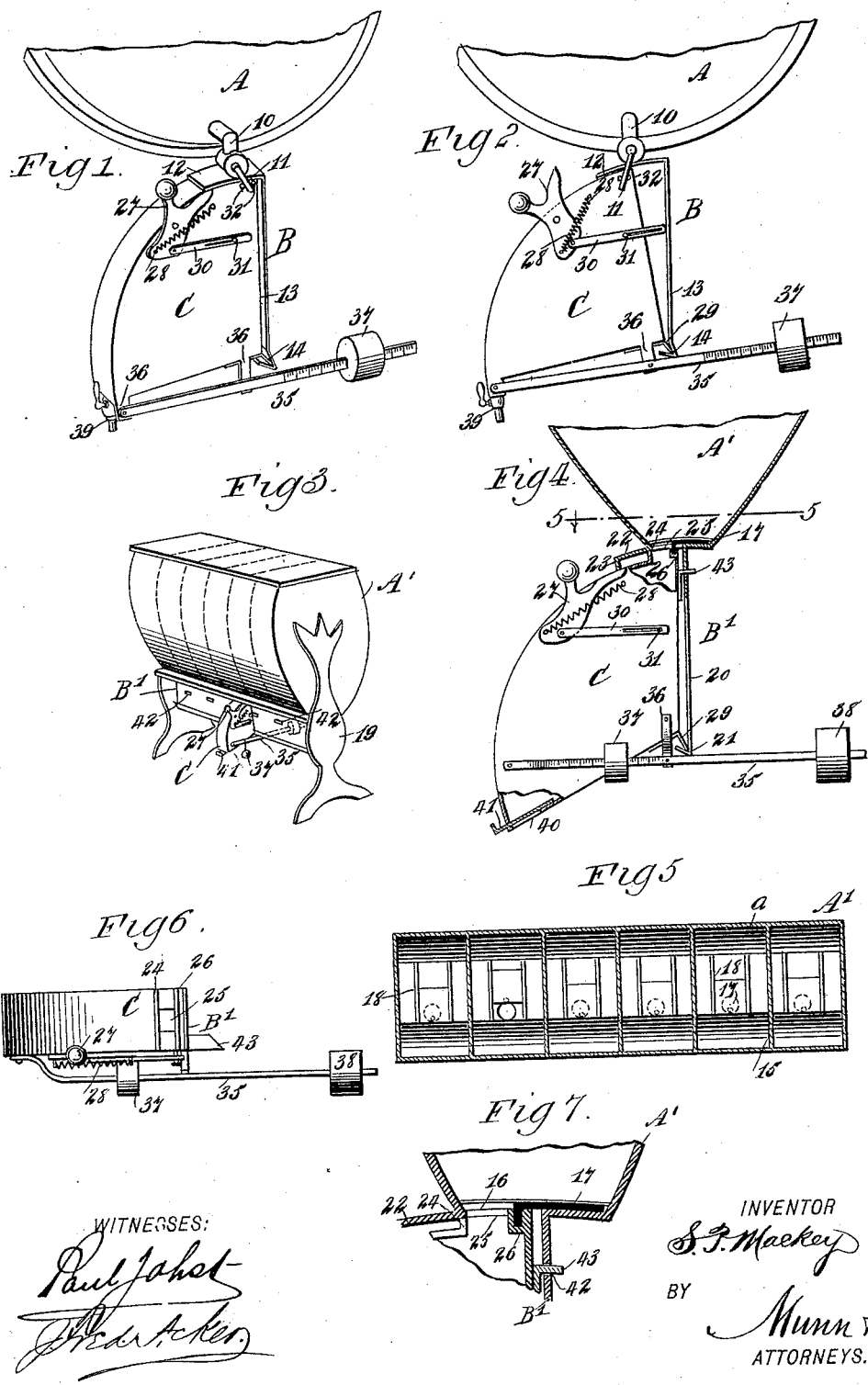
WITNESSES:
Paul Jahst
Fred Acker
INVENTOR
S. P. Mackey
BY
Munn & Co
ATTORNEYS.

UNITED STATES PATENT OFFICE.

SAMUEL P. MACKEY, OF RIDGEFIELD, WASHINGTON.

WEIGHING OR MEASURING MACHINE.

SPECIFICATION forming part of Letters Patent No. 569,878, dated October 20, 1896.

Application filed August 5, 1895. Serial No. 558,220. (No model.)

*To all whom it may concern:*

Be it known that I, SAMUEL P. MACKEY, of Ridgefield, in the county of Clarke and State of Washington, have invented a new and Improved Weighing or Measuring Machine, of which the following is a full, clear, and exact description.

The object of this invention is to provide a measure for use in grocery or other stores, and especially adapted for handling liquids, such as oils, syrups, &c., and also certain solids which will pour easily, such as ground spices, powder, shot, &c.

The main object of this invention is to provide a receptacle which, being placed in connection with a source of supply, will automatically shut off that supply when a predetermined quantity or weight of material has been received by the receptacle, the purpose being to relieve the merchant from the necessity of the close attention at present necessary in measuring or weighing out quick-flowing liquids or from the tedium of waiting in the event of measuring or weighing out slow-flowing materials, such as syrups.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the weighing and measuring receptacle, illustrating its adaptation for measuring and weighing liquids, the receptacle being shown in position to receive the material. Fig. 2 is a side elevation of the device shown in Fig. 1, illustrating the receptacle in position with the supply cut off. Fig. 3 is a perspective view of the device applied to a vessel having a series of compartments and illustrating also the adjustability of the weighing device to any of the compartments of the vessel. Fig. 4 is a partial side elevation and partial sectional view of a vessel and weighing device attached thereto, the device being adapted for the reception of solids. Fig. 5 is a horizontal section through the vessel in which the material to be weighed is stored, the said section being taken practically on the line 5 5 of Fig. 4. Fig. 6 is a plan view of the weighing device adapted for solids; and Fig. 7 is an enlarged sectional view of a portion of the receiving vessel and receptacle of the weighing device, illustrating the manner in which they are connected.

Any form of vessel A may be employed for the storage of the liquids or solids. In Figs. 1 and 2 the receptacle is in the nature of a barrel, and is provided with a faucet 10, the key of which is fitted with a crank-arm 11, and a frame B is connected to the bottom portion of the faucet and may be attached to the barrel, if desired. This frame comprises an upper slightly-curved member 12 and a longer vertical member 13, the latter member having a transverse groove 14 in its bottom edge, serving as a track.

The vessel shown in Figs. 3 and 5 is divided into a number of compartments $a$ by means of transverse partitions 15, and in the bottom of each of the said compartments an outlet 16 is made, adapted to be closed by a cover 17, held to slide in the bottom portion of the compartment, suitable ways 18 being provided for the said cover.

The vessel A' is supported upon suitable standards or legs 19, and a frame B' is attached to the bottom of the said vessel at what may be termed its "back," and this frame extends from one leg 19 to the other, and comprises, as shown in Fig. 4, a vertical member 20, having a groove 21, forming a track in or upon its forward face at the bottom. The under face of the vessel A' is somewhat concaved, and the bottom of the vessel at its front is provided with a forwardly-curved ledge 22, having a downwardly-extending flange 23.

The body portion of the weighing device consists of a receptacle C, which is somewhat quadrantal in shape, having practically two straight edges and one curved edge. When the device is to be used for weighing solids, the receptacle is provided with a collar 24 in its upper rear edge, which collar practically surrounds an opening 25 in the said receptacle, said opening being adapted for registry with the opening 16 in a compartment of the vessel A'. The collar is made wider upon one side of the opening than the other in order that a groove 26 may be made therein, as shown best in Fig. 7, to receive a flange from the slide 17 in the bottom of the vessel, so that when the receptacle is carried against the outer face of the frame B' the slide 17 will be carried from over the opening 16 in a compartment of the vessel A', and the opening in the said receptacle will register with the opening in the vessel, as shown in Fig. 7, and when the receptacle is in this position it is adapted to receive material from the vessel A'. The receptacle is held in this receiving position through the medium of a latch 27, which is pivoted at or near its center upon one side face of the said receptacle, and a spring 28, connected with the receptacle and latch, holds the latter in the open position. (Shown in Fig. 2.) As the receptacle is closed up against the frame the latch is carried downward and rearward, so that it will extend beyond the top extension 12 of the frame, or the ledge 22 in the form of frame B'. The receptacle is supported by forming a flange 29 upon the bottom portion of its rear edge, and the said flange is made to enter the groove in the bottom of the frame. Thus the receptacle will have a rocking bearing. The latch is prevented from opening too far by pivoting to its lower edge one end of a link 30, which link is horizontally located and receives a pin 31, secured upon the said receptacle.

When the device is used in connection with a faucet, its outward or forward movement is limited by the crank-arm 11 of the faucet being passed between two pins 32, secured at the upper rear corner of the receptacle, and these pins likewise serve to operate or turn the key of the faucet, whereas the receptacle of the device, when used for measuring solids, is limited in its outward movement by reason of the collar 24 striking against the flange 23 of the ledge 22.

A scale-beam 35 is in some instances secured to hangers 36, extending down from the bottom portion of the receptacle C, and the scale-beam is made to carry a balance 37, or, as shown in Fig. 4, the scale-beam 35 may be pivoted at its center upon a single hanger projected downward from the rear portion of the receptacle, and in this event the balance 37 is placed at the inner end of the scale-beam and an equipoise-weight 38 is located at the opposite end.

In the event the receptacle is used for receiving liquids a faucet 39 is placed in the bottom at its forward end, and when the receptacle is employed to receive solids an outlet 40 is made at the same point, covered normally by a slide 41, operated from the exterior of the receptacle. When the device is used in connection with a vessel divided into a number of compartments, (shown in Fig. 3,) the receptacle may be slid along the frame B', so as to be brought under any particular compartment, and in order to secure a proper registry of the receptacle with the outlet of a particular compartment immediately beneath each compartment an opening 42 is made in the frame B' and a lug 43 is secured upon the back of the receptacle C. Thus when the lug has entered an opening 42 the receptacle will be in perfect registry with the outlet in a compartment of the vessel.

In operation the balance is properly set on the scale-beam. The receptacle is then closed in against the frame and locked, which action opens communication between the storage vessel and the weighing or measuring receptacle C, and when the material in the weighing-receptacle shall have overcome the balance the receptacle will drop forward and downward and thereby close communication between it and the storage vessel. The contents of the weighing-receptacle C may then be readily removed.

Having thus described my invention, I claim as new and desire to secure by Letters Patent—

1. The combination with a storage vessel having a valve-controlled outlet, of a rocking measuring-receptacle below the said outlet and engaging the valve thereof to operate it, and a locking-latch carried by the receptacle and engaging a fixed portion of the supporting-frame to lock the receptacle in a receiving position, substantially as described.

2. The combination with a storage vessel, and a valve controlling its outlet, of a weighing or measuring receptacle, supported at one edge to rock beneath the storage vessel, the said measuring vessel being provided with an inlet adapted for registry with the outlet of the storage vessel and having connection with the valve of the latter for operating it, a locking-latch controlling one position of the measuring-receptacle, said latch being carried by the receptacle and engaging a fixed support, and a scale-beam secured to the lower part of the receptacle and having a movable balance thereon, said beam being tripped by the weight of the contents of the receptacle, substantially as described.

3. The combination, with a storage vessel provided with an outlet and a valve controlling the same, of a measuring-receptacle having a rocking support beneath the storage vessel, having a connection with the valve of the storage vessel and being also provided with an inlet adapted for registry with the outlet of the said storage vessel, a spring-controlled latch on the receptacle, a keeper on a fixed support and adapted for engagement with the latch at one position of the measuring-receptacle, a scale-beam carried by the receptacle and tripped by the movement of the said receptacle, and an outlet through which the contents of the receptacle may escape, as and for the purpose set forth.

4. The combination, with a storage vessel divided into compartments, each compartment being provided with a valve-controlled opening, and a frame extending along the bottom of the vessel, of a measuring and weighing device, comprising a receptacle having a sliding and rocking movement on the frame, a guide carried by the said receptacle, adapted for engagement with keepers located beneath each compartment, a connection between the receptacle and the cut-off of the said vessel, a locking device, and a scale-beam operated by the weight of the contents of the receptacle, substantially as set forth.

5. The combination with a storage vessel having an outlet in its bottom, of a rocking measuring-receptacle below the storage vessel and provided with an inlet-opening, a valve secured to the receptacle adjacent to its inlet-opening and working in guideways in the bottom of the storage vessel, and a latch carried by the receptacle for holding the receptacle in a receiving position, substantially as described.

6. The combination with a storage vessel having a valve-controlled outlet, of a frame below the vessel, a measuring-receptacle mounted on the frame to rock and connected with the valve thereof, a pivoted and spring-pressed latch on the receptacle and engaging a keeper on the frame, and a link pivoted to the latch and having a sliding connection with the receptacle, substantially as described.

SAMUEL P. MACKEY.

Witnesses:
ROBT. F. HALL,
GEO. F. LOEB.